United States Patent Office 3,629,371
Patented Dec. 21, 1971

3,629,371
CHLOROALKYLATED BLOCK COPOLYMERS
De Loss E. Winkler, Orinda, Calif., assignor to
Shell Oil Company, New York, N.Y.
No Drawing. Filed Oct. 21, 1968, Ser. No. 769,379
Int. Cl. C08f 15/04
U.S. Cl. 260—880
6 Claims

ABSTRACT OF THE DISCLOSURE

Chloroalkylated block copolymers having a high retention or rheological properties comprise chloroalkylated monovinyl arene polymer blocks connected by alpha-olefin (e.g., hydrogenated polyisoprene) polymer blocks.

---

This invention is concerned with the production of certain selective chloroalkylated block copolymers. More particularly, it is directed to the production of water swellable block copolymers which maintain a high degree of their original tensile strength and other elastomeric properties.

The chloroalkylation of polymers has been studied for the particular purpose of producing ion exchange resins. While such materials are useful either as such or in their aminated form, they have the material disadvantage of usually being brittle substances. Consequently, they tend to shatter or break due to thermal influences or physical shock and consequently exhibit material commercial limitations in these respects.

It would be particularly desirable to design a polymer which is useful not only as an ion exchange polymer but which also possesses a high degree of its original physical properties such as tensile strength, elongation, flexibility, etc., in spite of its derivatization.

It is an object of the present invention to provide an improved block polymer for use in water purification and other ion exchange situations. It is a particular object of the invention to provide such a polymer which has a commerically acceptable set of physical properties indicating its use where physical stresses are encountered. Other objects will become apparent during the following detailed description of the invention.

Now, in accordance with the present invention, novel block copolymers are provided having the general configuration A—B$(B—A)_{1-5}$ wherein each A is a non-elastomeric chloroalklyated poly(vinyl arene) block having a glass transition temperature above 20° C. and each B is a substantially saturated elastomeric alpha-olefin polymer block having a glass transition temperature below 0° C., said block copolymer being chloroalkylated to an extent sufficient to provide 5–9% by weight of chlorine in the polymer. The chloroalkylated polymers may be used as such or may be aminated with materials such as ammonia or primary, secondary, or tertiary amines.

It has been found that the class of block copolymers exhibits highly desirable water swellability while at the same time retaining a substantial proportion of their other physical properties including elasticity, tensile strength, modulus, and other properties. Thus their use in water purification programs is indicated as well as their use in ion exchange processes involving the purification of serums, brines, brackish water, sea water, etc.

The block copolymers utilized in the formation of these chloroalkylated derivatives normally comprise as the blocks A polymer blocks of monovinyl arenes such as styrene, alpha-methyl styrene, and mixtures thereof, while the blocks B are usually derived by hydrogenation of the preformed block polymer in such a way as to essentially avoid hydrogenation of the blocks A. Thus the blocks B in their original state are usually polymer blocks of conjugated dienes usually butadiene or isoprene or mixtures thereof. Upon hydrogenation these diene polymer blocks are then converted to essentially the equivalents of alpha-olefin polymer blocks and retain their elastomeric character as long as a sufficient amount of branching is present. Thus the hydrogenation of an isoprene polymer block converts it to what is essentially an ethylene propylene rubber block. If the originally conjugated diene block comprises butadiene, it is desirable to utilize a process which will produce a sufficiently branched structure which when hydrogenated results in an elastomeric block. Thus typical polymers which may be utilized as starting materials have the general configuration polystyrene-polyisoprene-polystyrene or polyalpha methyl styrene-polyisoprene-polyalpha methyl styrene. The average molecular weights of the individual blocks usually will vary from about 8,000 to 30,000 in the blocks A and from about 25,000 to 150,000 in the blocks B. Wherever any blocks B are adjacent to each other the average molecular weight of the joined binary block is to be considered as a single block. The block polymers are formed either by sequential processes or by coupling processes as desired, this not forming an essential aspect of the present invention.

In order to obtain the selective chloroalkylation required for maintenance of the desired set of elastomeric properties, it is necessary to hydrogenate or otherwise inactivate the conjugated diene polymer blocks. Selective hydrogenation is carried out by means of certain catalysts which will hydrogenate only conjugated diene linkages while not materially effecting the unsaturation of the poly(monovinyl arene) polymer blocks. Nickel on kieselguhr may be employed as a suitable catalyst but still more preferred as catalysts for selective hydrogenation are the reduced metal products of a metal of the group consisting of cobalt, nickel, manganese, molybdenum, and mixture thereof wherein the reduced metal product is obtained by reacting a compound containing a molecular form of said metal and a metal compound reducing agent such as aluminum hydrocarbyl compound. Specifically, a preferred catalyst comprises the reduction product formed by reaction of nickel acetate with aluminum triethyl.

The selectively hydrogenated block copolymers obtained as described above are then treated to form the selectively derived chloroalkylated products or their aminated counterparts.

The haloalkylation reaction, which usually occurs at temperatures in the range of from −10 to 120° C. or higher is carried out while the copolymer is swollen by or dispersed in a chloroalkyl alkyl ether, particularly chloromethyl methyl ether. About 0.01 to 1 mole of a catalyst preferably 0.05–0.5 mole are employed per mole of copolymer calculated on the average molecular weight of the monomers. The reaction is advantageously carried out to a point at which the copolymer contains an average of about 0.5 to 1.5 haloalkyl groups per aromatic nucleus. Expressed in other terms, it is desirable for the product to contain between 5 and 9% by weight of chlorine substituents. The chloroalkylating agents are preferably chloromethylating agents such as chloromethyl methyl ether utilized in the presence of a Friedel-Crafts catalyst such as zinc chloride, zinc oxide, stannic chloride, aluminum chloride, etc. The reaction is stopped after the reaction period by the addition of water and a polar material such as dioxane. The polymer is then coagulated in an alcohol such as methanol, washed, dissolved in a suitable solvent such as benzene, and again coagulated in methanol.

It is to be emphasized that there is no necessity for nor desirability of crosslinking as is normally required in ion exchange resins in order to obtain sufficient physical strength. The peculiar structure of the present block copolymers is such that the physical strength is created by the non-elastomeric domains comprising the monovinyl arene polymer blocks which in effect replace the chemical crosslinks and thereby not only eliminate the relatively costly step but also enable the reuse of the polymer or reshaping thereof such as cannot be effected with crosslinked polymeric substances.

If so desired, the chloroalkylated block copolymers may be reacted with an aminating agent such as ammonia or amines to produce ion exchange resins or polymers especially suitable for water purification. Weakly basic resins are formed from ammonia or the primary and secondary amines. Suitable amines for this purpose include methylamine, dimethylamine, or the other alkyl amines of either primary or secondary structure including benzylamine and the like. Another class of ion exchange polymers may be obtained by reaction with strongly basic quaternary ammonium forming compounds such as tertiary amines including trimethylamine, triethylamine, tributylamine, etc. The amines are preferably aliphatic, especially alkyl or heterocyclic amines. The amination may be effected by reaction of the amine or ammonia with the copolymers having the chloroalkyl radicals attached to their aromatic nuclei by reaction at temperatures of from 20–150° C., preferably from 25 to 100° C. in the presence or absence of a dispersing medium. It is often desirable to include a catalyst for the reaction such as a heavy metal halide, e.g., cupric iodide, calcium iodide, or the like.

The products of this invention may be blended if desired with the parent copolymers to obtain modified compositions having a high degree of tensile strength and other properties although the chloroalkylated or aminated derivatives thereof have a remarkedly high retention of their original physical properties.

Within this general area it has been found that relatively thin films are capable of absorbing 10–100% by weight based on the film weight of water at least in 24 hours at ambient temperatures. Thus it is indicated that these materials are especially suitable for use in water purification, involving food products, or the desalting of brines or sea water as well as brackish water, particularly in the so-called membrane types of processes being used for this purpose.

The membrane processes remove either salt from saline water or water from salt by passing saline water through the membrane. The processess include electrodialysis, osmionic, reverse osmosis, thermal osmosis and related processes as well as their combination. Dependent upon the specific membrane material utilized for this purpose, it is preferred that the membranes be prepared from a medium incorporating water as one of its components. Preferably under these conditions it is still further advisable to avoid complete air drying of the film prior to its use in desalinizing water so as to maintain its original high capacity in this respect. When pressure is utilized against the diaphragm, best results are obtained when the pressure is applied to a concentrated brine in one or more stages starting at about 1,000 p.s.i.g., and increasing stagewise to about 3,000 p.s.i.g. The membranes may be in the form of sheets or may be shaped to any desirable alternate shapes such as in the form of tubing and the like. The surface of the membrane may be altered by superficial coatings if so desired such as coatings of quaternary or tertiary amine derivatives of polyvinyl aromatic hydrocarbons, melamine formaldehyde resins admixed with guanidine or polyacrylic or polymethacrylic acids. Such coatings may be applied in any usual manner as by first spraying and if necessary grafting or crosslinking to the surface of the chloroalkylated block copolymer. Plasticizers may be employed for flexibilizing the membrane material and to aid in depositing a suitable membrane.

A pore forming agent may be utilized if desired to increase the osmotic properties of the diaphragm. Plasticizers are suitable to some degree for this purpose and thus perform a dual role. After serving as a plasticizer during formation of the membrane, it then may serve as a pore former during and after washing. Thus bifunctional components as dextrose, sucrose and other sugars as well as water soluble polyhydroxy alcohols including glycerol and polyalkylene glycols as well as their water soluble ethers and esters may be employed. The membranes normally do not require reinforcement but if desired they may be altered by deposition on or laminating with fibers or fabrics such as Dacron, polyvinyl chloride, nylon, and the like. Suitable proportions of plasticizers are 10–50 parts per 100 parts of the chloroalkylated polymer. The membranes are suitably thin, in the order of .01–3 millimeters. Of course, thicker membranes provide increased strength but suffer from decreased rate of water transmission. Thicknesses above 0.5 millimeter are ordinarily unnecessary.

The following examples illustrate the preparation and pertinent water absorption properties of chloroalkylated products of this invention.

EXAMPLE I

A block copolymer was prepared having the structure polystyrene-polyisoprene-polystyrene wherein the block molecular weights were 18,000—88,000—20,000. This block copolymer was prepared by sequential polymerization utilizing lithium secondary butyl as the initiator with sequential addition first of styrene, then of isoprene and finally of styrene. The polymer was then selectively hydrogenated utilizing a reduced cobalt catalyst as the selective hydrogenating catalyst to produce a product having the general structure polystyrene-(ethylene propylene rubber)-polystyrene. 50 grams of this selectively hydrogenated block copolymer was dispersed in 500 grams of chloromethyl methyl ether. 7.6 grams (0.029 moles) of stannic chloride was added to the solution at 50° C. After one hour at that temperature the reaction was stopped by adding a solution of 10 cc. of water and 30 cc. of 1,4-dioxane. The polymer was then coagulated in methanol, washed, dissolved in benzene, and finally coagulated in methanol. The dried polymer contained 6.5% chlorine. The theoretical chlorine content with 1 chloromethyl group per styrene in the above polymer would have been 9.0%. In a second run, utilizing the same charge but reacting for only 30 minutes, the product contained 5.5% of chlorine.

The products so obtained are aminated by reaction with tertiary amines and are cast as thin films which show a substantial absorption of water thus indicating their suitability for use in water purification processes.

I claim as my invention:

1. A block copolymer having the general configuration

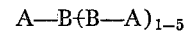

wherein each A is a non-elastomeric chloroalkylated poly (vinyl arene) block having, prior to chloroalkylation, from 0% to not more than about 25% of its aromatic double bonds saturated with hydrogen, and each B is a substantially saturated elastomeric alpha-olefin polymer block, said block copolymer being chloroalkylated to an extent sufficient to provide at least 5% by weight of chlorine substitutents, and up to one chlorine substituent per vinyl arene nucleus.

2. A block cooplymer according to claim 1 wherein the chloroalkyllated radicals are chloromethyl radicals.

3. A block copolymer according to claim 2 wherein the blocks B are hydrogenated polyisoprene blocks.

4. A block copolymer according to claim 2 wherein the blocks A are chloromethylated polystyrene blocks.

5. A block copolymer according to claim 1 having the structure chloromethylated polystyrene-hydrogenated polyisoprene-chloromethylated polystyrene wherein the chlorine content is 5.5–8.5% by weight, the polystyrene blocks have average molecular weights of 8,000–30,000 and the polyisoprene block has an average molecular weight of 25,000–150,000.

6. A block copolymer according to claim 1 wherein chloroalkyl radicals have been aminated with a member of the group consisting of ammonia and primary, secondary, and tertiary amines.

References Cited

UNITED STATES PATENTS

| | | | |
|---|---|---|---|
| 3,311,602 | 3/1967 | Raley | 260—93.5 |
| 3,465,063 | 9/1969 | Hassell et al. | 260—876 |
| 3,485,787 | 12/1969 | Haefele et al. | 260—33.6 |

JOSEPH L. SCHOFER, Primary Examiner

R. A. GAITHER, Assistant Examiner

U.S. Cl. X.R.

260—2.1, 878, 879